US009298828B1

(12) United States Patent
Das et al.

(10) Patent No.: US 9,298,828 B1
(45) Date of Patent: *Mar. 29, 2016

(54) SUPPLEMENTING SEARCH RESULTS WITH HISTORICALLY SELECTED SEARCH RESULTS OF RELATED QUERIES

(71) Applicant: GOOGLE INC., Mountain View, CA (US)

(72) Inventors: Abhinandan Sujit Das, Sunnyvale, CA (US); Anwis Das, Sunnyvale, CA (US); Nitin Gupta, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/666,936

(22) Filed: Nov. 1, 2012

Related U.S. Application Data

(60) Provisional application No. 61/556,137, filed on Nov. 4, 2011.

(51) Int. Cl.
*G06F 17/30* (2006.01)

(52) U.S. Cl.
CPC ................................ *G06F 17/30864* (2013.01)

(58) Field of Classification Search
CPC .................. G06F 17/30905; G06F 17/3064
See application file for complete search history.

(56) References Cited

U.S. PATENT DOCUMENTS

| | | | | |
|---|---|---|---|---|
| 7,765,227 | B1 * | 7/2010 | Khoshnevisan | .. G06F 17/30867 707/769 |
| 8,041,730 | B1 * | 10/2011 | Upstill et al. | .................. 707/769 |
| 8,589,429 | B1 * | 11/2013 | Thirumalai | ......... G06F 17/3064 707/729 |
| 2002/0139839 | A1 * | 10/2002 | Catan | ............................ 235/375 |
| 2006/0235860 | A1 * | 10/2006 | Brewer | ............. G06F 17/30864 |
| 2008/0281817 | A1 * | 11/2008 | White | ............... G06F 17/30867 |

* cited by examiner

*Primary Examiner* — Mariela Reyes
*Assistant Examiner* — Courtney Harmon

(57) ABSTRACT

A computer-implemented method for identifying search results satisfying a search query received from a user includes obtaining a set of ranked search results that satisfies the search query, and identifying, using historical search query data, a search result that was selected by users who issued the search query and that corresponds to at least one related search query in at least one chain of related search queries that are related to the search query. The method further includes determining, using the historical search query data, a frequency that the search query led to a selection of the identified search result; inserting the identified search result into the set of ranked search results based on the frequency that the search query led to the selection of the identified search result; and returning the set of ranked search results to the user.

33 Claims, 9 Drawing Sheets

SUPPLEMENTING SEARCH RESULTS WITH HISTORICALLY SELECTED SEARCH RESULTS OF RELATED QUERIES

RELATED APPLICATIONS

This application claims priority to U.S. Provisional Patent Application No. 61/556,137, "System and Method for Identifying Search Results Satisfying a Search Query," filed Nov. 4, 2011, which is hereby incorporated by reference in its entirety.

TECHNICAL FIELD

The disclosed embodiments relate generally to identifying search results satisfying a search query.

BACKGROUND

Search engines typically identify ranked search results that satisfy a search query by identifying search results (e.g., documents) that include the search terms in the search query and ranking the search results based on ranking factors such as a number of documents that link to a respective document corresponding to a respective search result. However, these ranking factors do not contemplate whether the ranked search results include desired search results for the users. Accordingly, users tend to issue multiple search queries that refine the initial search query issued by the users until the desired search result is identified.

SUMMARY

In accordance with some embodiments, a computer-implemented method for identifying search results satisfying a search query is performed on a server having at least one processor and memory storing at least one program for execution by the at least one processor to perform the method. The method includes receiving a set of ranked search results that satisfies a search query received from a user, and identifying, using historical search query data, a search result that was selected by users who issued the search query and that corresponds to at least one related search query in at least one chain of related search queries that are related to the search query, each respective related search query in the at least one chain of related search queries except for a last related search query in the at least one chain of related search queries violating a search result selection criterion. The method further includes determining, using the historical search query data, a frequency that the search query led to a selection of the identified search result; inserting the identified search result into the set of ranked search results based on the frequency that the search query led to the selection of the identified search result; and returning the set of ranked search results to the user.

In some embodiments, inserting the identified search result into the set of ranked search results based on the frequency that the search query led to the selection of the identified search result includes determining, based on the historical search query data, a frequency that each ranked search result in the set of ranked search results was selected; identifying a ranked search result in the set of ranked search results that is a highest ranked search result where a frequency that the ranked search result was selected is less than the frequency that the search query led to the selection of the identified search result; and inserting the identified search result in the set of ranked search results at a higher rank than a rank of the ranked search result.

In another aspect, a system to identifying search results satisfying a search query includes at least one processor, memory, and at least one program stored in the memory and executable by the at least one processor. The at least one program has instructions that when executed by the system cause the system to perform the aforementioned method.

In yet another aspect, a non-volatile computer readable storage medium stores at least one program, executable by at least one processor of a computer system. The at least one program has instructions that when executed by the system cause the computer system to perform the aforementioned method.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

DESCRIPTION OF EXAMPLE EMBODIMENTS

The embodiments described herein provide techniques for identifying a likely desired search result.

Figure 1:
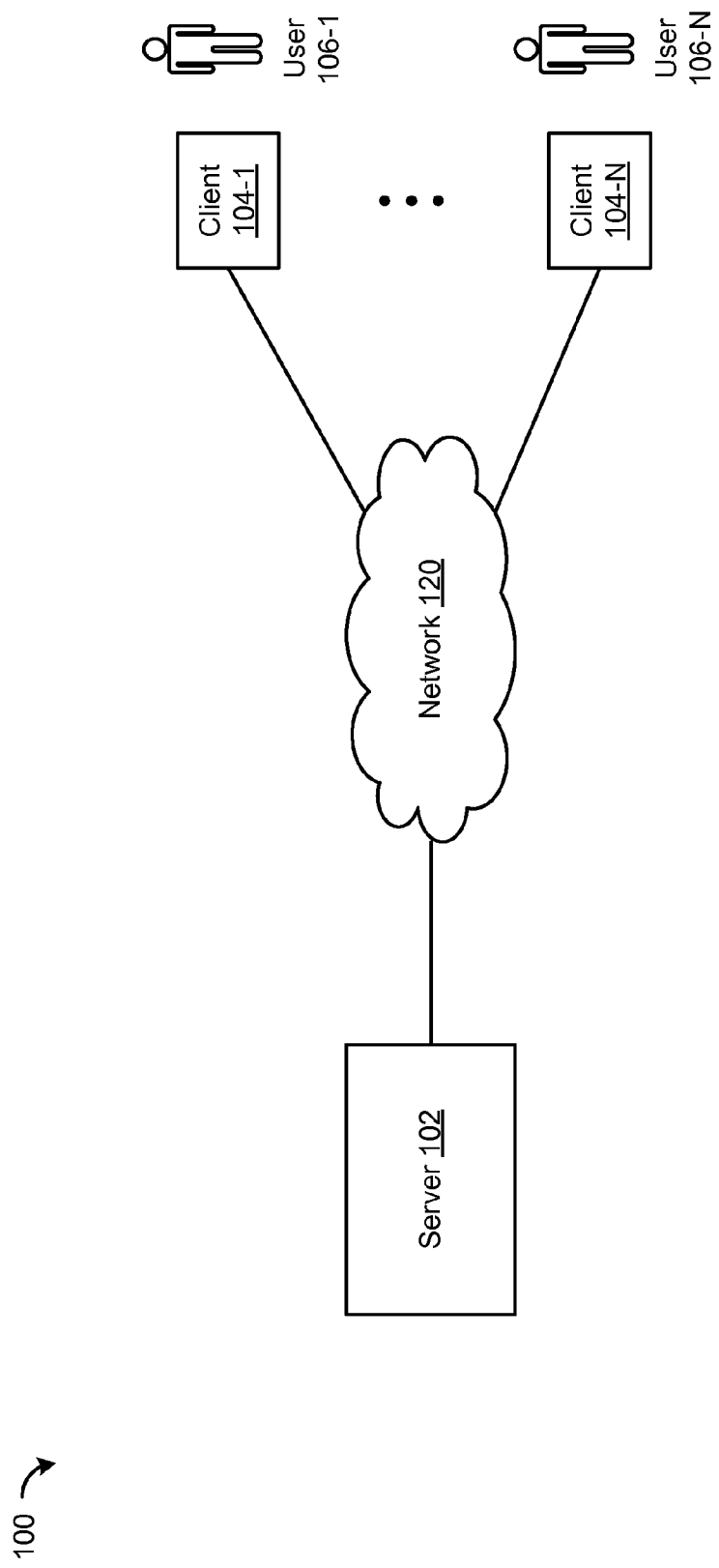
FIG. 1 is a block diagram illustrating a network system, according to some embodiments.

FIG. 1 is a block diagram illustrating a network system 100, according to some embodiments. The network system 100 includes a server 102 coupled to clients 104 for users 106 via network 120. Network 120 can generally include any type of wired or wireless communication channel capable of coupling together computing nodes. This includes, but is not limited to, a local area network, a wide area network, or a combination of networks. In some embodiments, network 120 includes the Internet.

In some embodiments, the server 102 identifies search results satisfying search queries issued by users 106 of clients 104. In some implementations the server 102 augments (or modifies) the identified search results based on historical search query data. In some implementations the server 102 identifies related search queries that are related to search queries that are submitted by the users 106. The server 102 is described in more detail below with reference to FIGS. 2-11.

Note that although FIG. 1 shows one instance of the server 102, multiple servers may be present in the network system 100. For example, the server 102 may include a plurality of distributed servers. The plurality of distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.).

Also note that although the embodiments described herein refer to the server 102 and the client 104-1, the embodiments may be applied to multiple servers and clients. Furthermore, the functionality of the server 102 may be implemented within a single server (or a set of distributed servers each including the functionality of the server 102) or may be implemented across multiple servers each including a subset of the functionality of the server 102 (or multiple sets of distributed servers where each set of distributed servers includes a subset of the functionality of the server 102).

Figure 2:
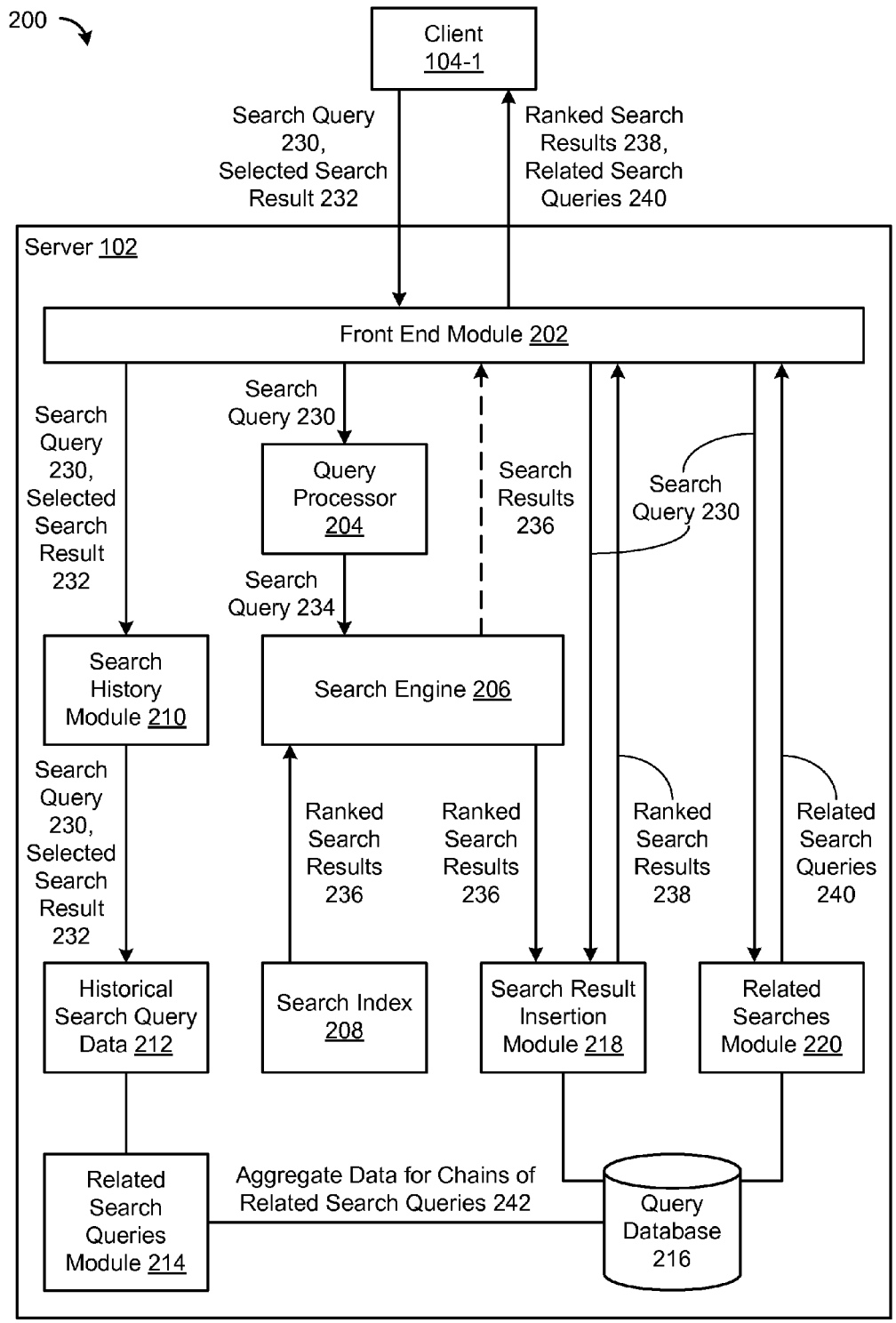
FIG. 2 is a block diagram illustrating an example process for handling search queries, according to some embodiments.

FIG. 2 is a block diagram 200 illustrating an example process for handling search queries, according to some embodiments. In the example process illustrated in FIG. 2, the user 106-1 uses the client 104-1 to issue a search query 230 to the server 102. The front end module 202 of the server 102 receives the search query 230 and provides the search query to a query processor 204, a search history module 210, and at least one of a search result insertion module 218 and a related searches module 220. The query processor 204 normalizes and/or expands the search query 230 to produce a search query 234 that provided to a search engine 206. The search engine 206 uses a search index 208 to obtain search results that satisfy the search query 230 and ranks the search results to produce ranked search results 236. In some embodiments, the search engine 206 provides the ranked search results 236 to the front end module 202, which in turn provides the ranked search results 236 to the client 104-1.

Figure 3:
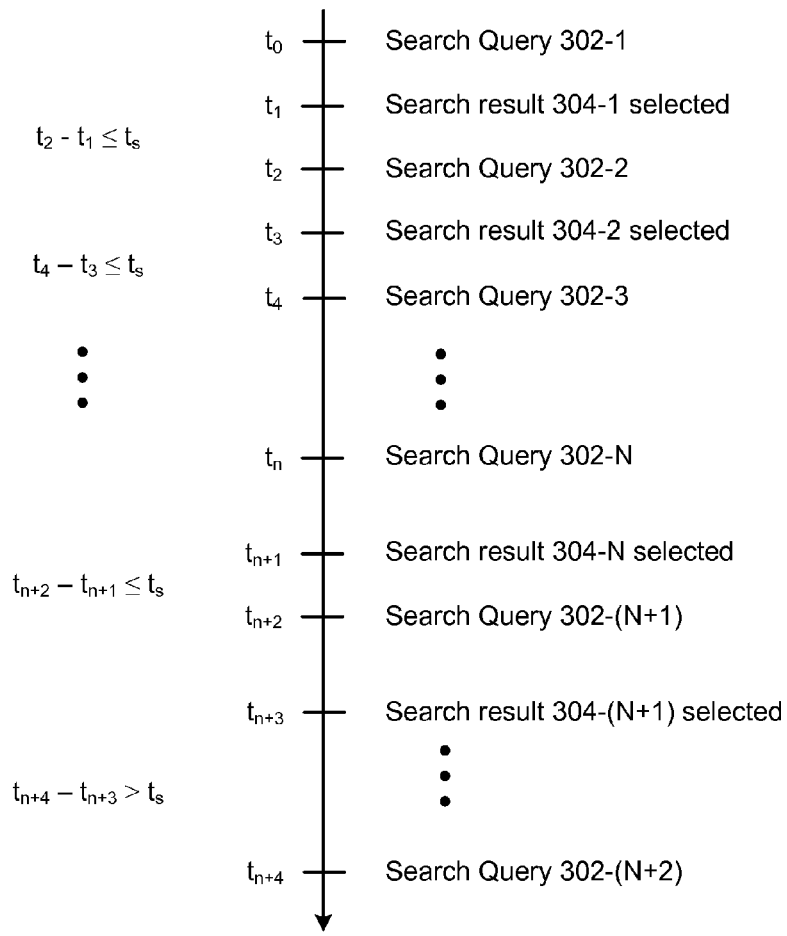
FIG. 3 illustrates an example sequence of search queries and selections of search results for a user, according to some embodiments.

The ranked search results 236 may not include a desired search result for the user 106-1. In fact, the user 106-1 may issue several subsequent related search queries and select one or more search results (e.g., click on links for search results to access documents or using other selection means) corresponding to the subsequent related search queries until the user 106-1 finds the desired search result. For example, FIG. 3 illustrates an example sequence of search queries and selections of search results for the user 106-1, according to some embodiments. The example sequence of search queries and selections of search results illustrated in FIG. 3 may be obtained from historical search query data (e.g., historical search query data 212 in FIG. 2) such as search query logs or other search query data. As illustrated in FIG. 3, the user 106-1 issues a search query 302-1 to the server 102 at $t_0$. The server 102 then returns a set of search results corresponding to the search query 302-1 to the user 106-1. At $t_1$, the user 106-1 selects a search result 304-1 in the set of search results corresponding to the search query 302-1. Note that the user 106-1 may select more than one search result in the set of search results corresponding to the search query 302-1. The user 106-1 then issues a search query 302-2 to the server 102 at $t_2$. The server 102 then returns a set of search results corresponding to the search query 302-2 to the user 106-1. At $t_3$, the user 106-1 selects a search result 304-2 in the set of search results corresponding to the search query 302-1. The user 106-1 then issues a search query 302-3 to the server 102 at $t_4$. The user 106-1 continues the process of issuing search queries to the server 102 and selecting search results as illustrated in FIG. 3.

The historical search query data 212 typically includes one or more chains of related search queries. A chain of related search queries is (1) a sequence of consecutive search queries that is issued by a user and (2) that includes a first search query which is successively refined until search results corresponding to a last search query in the sequence of consecutive search queries includes a desired search result that is then selected by the user. A refinement of a search query may include, but is not limited to, a prior search query issued by the user that includes changes in search terms and/or a selection by the user of another page (or another set) of search results corresponding to the prior search query. In some embodiments, a sequence of consecutive search queries is interpreted as a chain (or a sequence) of related search queries when each search query in the sequence of consecutive search queries except for a last search query in the sequence of consecutive search queries violates a search result selection criterion. In other words, for a chain of related search queries, each related search query in the chain of related search queries except for a last related search query in the chain of related search queries violates the search result selection criterion. In some embodiments, a search query in a sequence of consecutive search queries satisfies the search result selection criterion when a time interval between (1) a time when users selected a search result corresponding to the search query in the sequence of consecutive search queries and (2) a time when users issued a subsequent search query in the sequence of consecutive search queries exceeds a predetermined time interval. In other words, for a chain of related search queries, a related search query in the chain of related search queries satisfies the search result selection criterion when a time interval between a time when users selected a search result corresponding to the related search query in the chain of related search queries and a time when users issued a subsequent search query exceeds a predetermined time interval. For example, if the predetermined time interval is $t_s$, the search queries 302-1 to 302-(N+1) are determined to be in a chain of related search queries because each related search query in the chain of related search queries except for a last related search query (e.g., the search query 302-(N+1)) in the chain of related search queries violates the search result selection criterion. Specifically, (1) the time interval between a time (e.g., $t_1$, $t_3$, ..., $t_{n+1}$) when users selected a search result corresponding to the related search query in the chain of related search queries (e.g., the search results 304-1, 304-2, ... 304-N) and a time (e.g., $t_2$, $t_4$, ..., $t_{n+2}$) when users issued a subsequent search query (e.g., the search queries 302-2, 302-3, ... 302-N, 302-(N+1)) is less than or equal to the predetermined time interval $t_s$ (e.g., $t_2-t_1 \leq t_s$, ..., $t_{n+2}-t_{n+1} \leq t_s$) and (2) a time interval between a time (e.g., $t_{n+3}$) when users selected a search result corresponding to the last related search query in the chain of related search queries (e.g., the search result 304-(N+1) corresponding to the search query 302-(N+1)) and a time when users issued a subsequent search query (e.g., the search query 302-(N+2)) exceeds a predetermined time interval (e.g., $t_{n+4}-t_{n+3} > t_s$). Note that the search query that satisfies the predetermined time interval includes the desired search result.

Note that the chains of related search queries may occur at any point in time in the historical search query data 212. For example, if the search query 302-1 and the search query 302-2 were issued in a different search session, the search query 302-3 may be determined to be a first search query to be considered in a chain of related search queries. In some implementations, a search session for a user includes search queries issued by the user within a predetermined time period. In some implementations, a search session for a user includes all search queries issued by the user in a single login session (e.g., identified by a user identifier, an anonymous session identifier, etc.). In some implementations a search session for a user includes search queries issued by the user within a predetermined time period and in a single login session. For example, a search session for a user may include all search queries issued by the user in a single day (e.g., 12 AM-11:59 PM). In another example, a search session for a user may include all search queries issued by the user within an hour. In another example, a search session for a user may include all search queries issued by the user in a single login session, optionally subject to other constraints such as time constraints and/or user behavior constraints.

In some embodiments, the historical search query data 212 includes frequencies that respective search queries led to selections of respective search results. In some implementations, the historical search query data 212 includes raw search session data from which the frequencies that respective search queries led to selections of respective search results are derived. In some implementations, the historical search query data 212 includes the determined frequencies that respective search queries led to selections of respective search results.

Returning to FIG. 2, a relationship between a first related search query in a chain of related search queries and a search result (i.e., the desired search result) that was selected by the user from a set of search results corresponding to a last related search query in the chain of related search queries may be used to infer that the user would have selected the search result had the search result been included in the set of search results corresponding to the first related search query. Other users may have issued the same first related search query and selected the same search result in the same or different chain of related search queries. A ratio (or a transition rate) between a number of times that the first related search query led to the selection of the search result (e.g., the desired search result) and a total number of times the first related search query was issued provides an indication of a likelihood that a user issuing the first related search query would select the search result. This ratio and other statistics for this chain of related search queries and for other chains of related search queries may be obtained from the historical search query data 212 and aggregated to generate aggregate data for chains of related search queries (e.g., aggregate data for chains of related search queries 242, as described below). In some embodiments, a search result insertion module 218 identifies at least one search result based on the aggregate data for chains of related search queries 242 obtained from a query database 216 and the search query 230. The search result insertion module 218 then inserts the at least one search result into the ranked search results 236 to produce the ranked search results 238. The search result insertion module 218 then provides the ranked search results 238 to the front end module 202, which in turn provides the ranked search results 238 to the client 104-1. The search result insertion module 218 is described in more detail with reference to FIG. 8-9.

The relationship between a first related search query in a chain of related search queries and a last related search query that produced the set of search results including the search result (i.e., the desired search result) that was selected by the user may be used to infer that the last related search query is a related search query that the user may issue to produce other relevant search results. As discussed above, other users may have issued the same first related search query and selected the same search result (i.e., the desired search result) in the same or different chain of related search queries. Thus, there may be multiple last related search queries that correspond to the first related search query and the search result (i.e., the desired search result). In some embodiments, a related searches module 220 identifies related search queries 240 based on the aggregate data for chains of related search queries 242 obtained from the query database 216 and the search query 230. The front end module 202 returns the related search queries 240 to the front end module 202, which in turn provides the related search queries 240 to the client 104-1. The related searches module 220 is described in more detail below with reference to FIG. 11.

In some embodiments, the ranked search results 238 and the related search queries 240 are both provided to the client 104-1 by the front end module 202. In some embodiments, the ranked search results 236 and the related search queries 240 are both provided to the client 104-1 by the front end module 202.

In some implementations, a search history module 210 anonymously stores search queries issued by users and search results selected by the users in the historical search query data 212 (e.g., query logs or other historical query data) and associates the search queries issued by the users and the search results selected by the users with the respective users. In the example discussed above, the search history module 210 stores the search query 230 and a timestamp associated with the search query 230 in the historical search query data 212 and associates the user 106-1 with the search query 230. When the user 106-1 selects a search result (e.g., a selected search result 232) from the ranked search results 238 (or the ranked search results 236), the client 104-1 sends information identifying the selected search result 232 to the server 102. The front end module 202 receives the information identifying the selected search result 232 and provides the information identifying the selected search result 232 to the search history module 210. The search history module 210 stores the information identifying the selected search result 232 in the historical search query data 212 and associates the user 106-1 with the information identifying the selected search result 232.

A related search queries module 214 uses the historical search query data 212 to identify chains of related search queries and the aggregate data for chains of related search queries 242. The related search queries module 214 stores the aggregate data for chains of related search queries 242 in the query database 216. The related search queries module 214 is described in more detail below with reference to FIG. 7.

Figure 4:
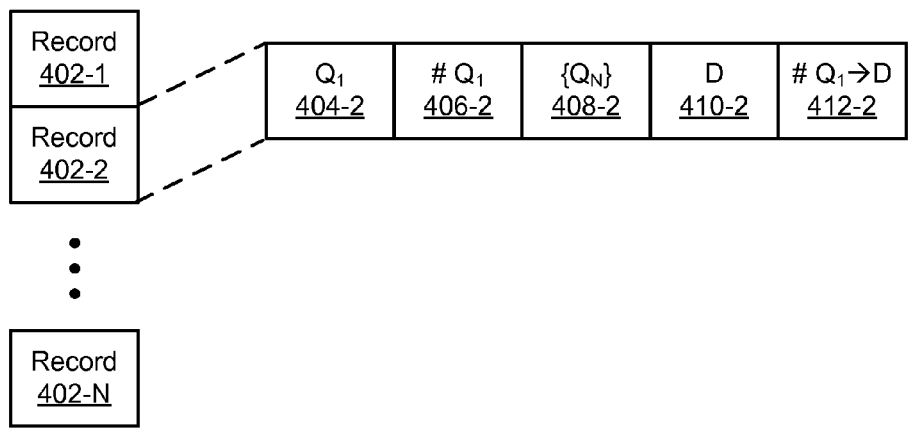
FIG. 4 is a block diagram illustrating a data structure for storing aggregate data for chains of related search queries in a query database, according to some embodiments.

FIG. 4 is a block diagram illustrating a data structure for storing aggregate data for chains of related search queries 242 in the query database 216, according to some embodiments. As illustrated in FIG. 4, the query database 216 includes a plurality of records 402, each of which corresponds to a first related search query and a desired search result. A respective record 402 includes a field 404 for storing a first search query ($Q_1$) in chains of related search queries associated with a desired search result, a field 406 for storing a number of times that the first related search query was issued (# Q1), a set of last search queries $\{Q_N\}$ in the chains of related search queries that correspond to search results including the desired search result, a field 410 for storing information identifying the desired search result (D), and a field 412 for storing a number of times that the first related search query led to a selection of the desired search result (# Q1→D).

Figure 5:
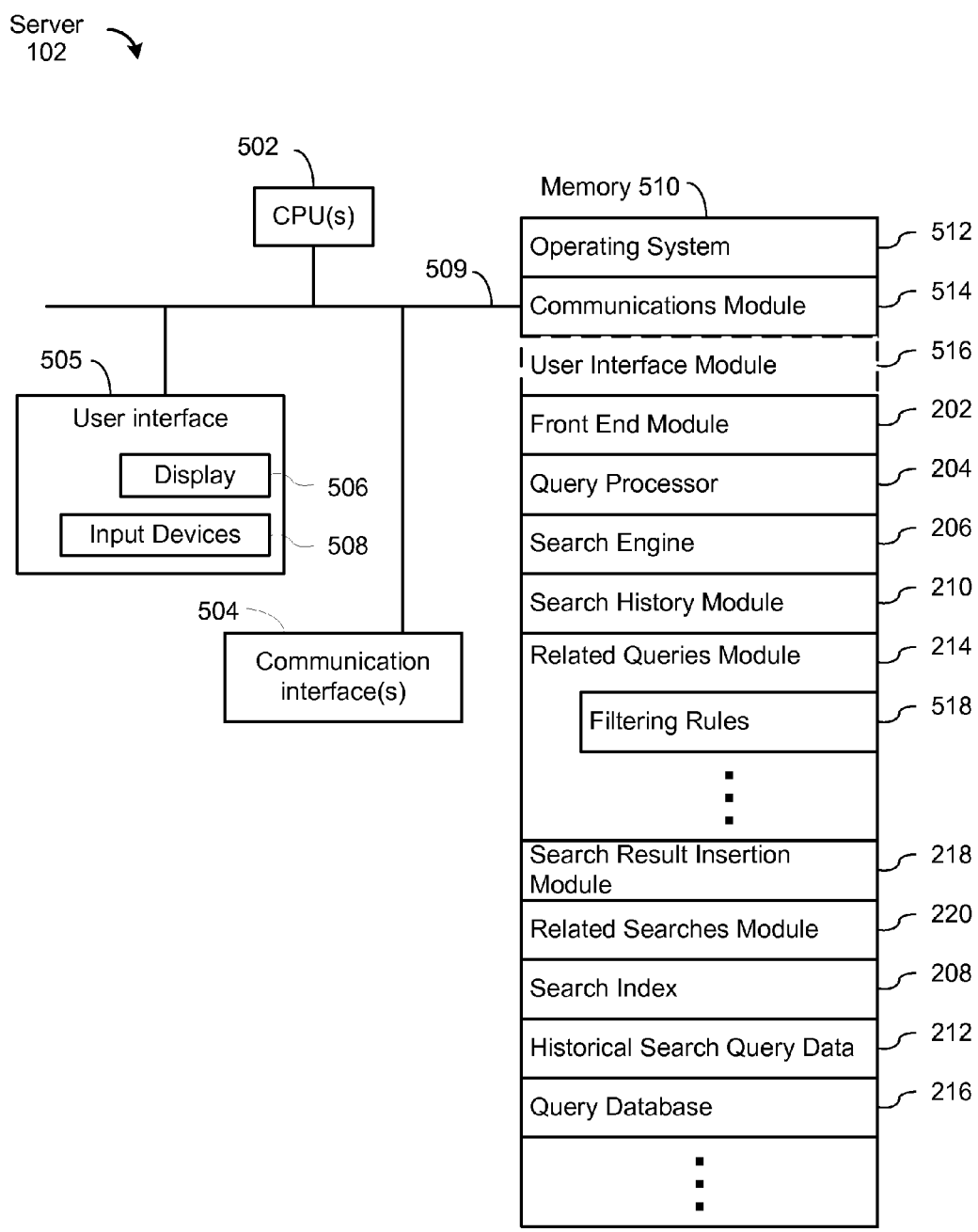
FIG. 5 is a block diagram illustrating a server, according to some embodiments.

FIG. 5 is a block diagram illustrating the server 102, according to some embodiments. The server 102 typically includes one or more processing units (CPU's, sometimes called processors) 502 for executing programs (e.g., programs stored in memory 510), one or more network or other communications interfaces 504, memory 510, and one or more communication buses 509 for interconnecting these components. The communication buses 509 may include circuitry (sometimes called a chipset) that interconnects and controls communications between system components. The server 102 optionally includes (but typically does not include) a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some embodiments, memory 510 or the computer readable storage medium of memory 510 stores the following programs, modules and data structures, or a subset thereof:

- an operating system 512 that includes procedures for handling various basic system services and for performing hardware dependent tasks;
- a communication module 514 that is used for connecting the server 102 to other computers via the one or more communication interfaces 504 (wired or wireless) and one or more communication networks, such as the Internet, other wide area networks, local area networks, metropolitan area networks, and so on;
- an optional user interface module 516 that receives commands from the user via the input devices 508 and generates user interface objects in the display device 506;
- the front end module 202, as described herein;
- the query processor 204, as described herein;
- the search engine 206, as described herein;
- the search history module 210, as described herein;
- the related search queries module 214 including filtering rules 518 that are used by the related search queries module 214 to filter out chains of related queries in accordance with the filtering rules 518, as described herein;
- the search result insertion module 218, as described herein;
- the related searches module 220, as described herein;
- the search index 208, as described herein;
- the historical search query data 212, as described herein; and
- the query database 216, as described herein.

In some embodiments, the programs or modules identified above correspond to sets of instructions for performing a function described above. The sets of instructions can be executed by one or more processors (e.g., the CPUs 502). The above identified modules or programs (i.e., sets of instructions) need not be implemented as separate software programs, procedures or modules, and thus various subsets of these programs or modules may be combined or otherwise re-arranged in various embodiments. In some embodiments, memory 510 stores a subset of the modules and data structures identified above. Furthermore, memory 510 may store additional modules and data structures not described above.

Although FIG. 5 shows a "server," FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers and how features are allocated among them will vary from one implementation to another, and may depend in part on the amount of data traffic that the system must handle during peak usage periods as well as during average usage periods.

Figure 6:
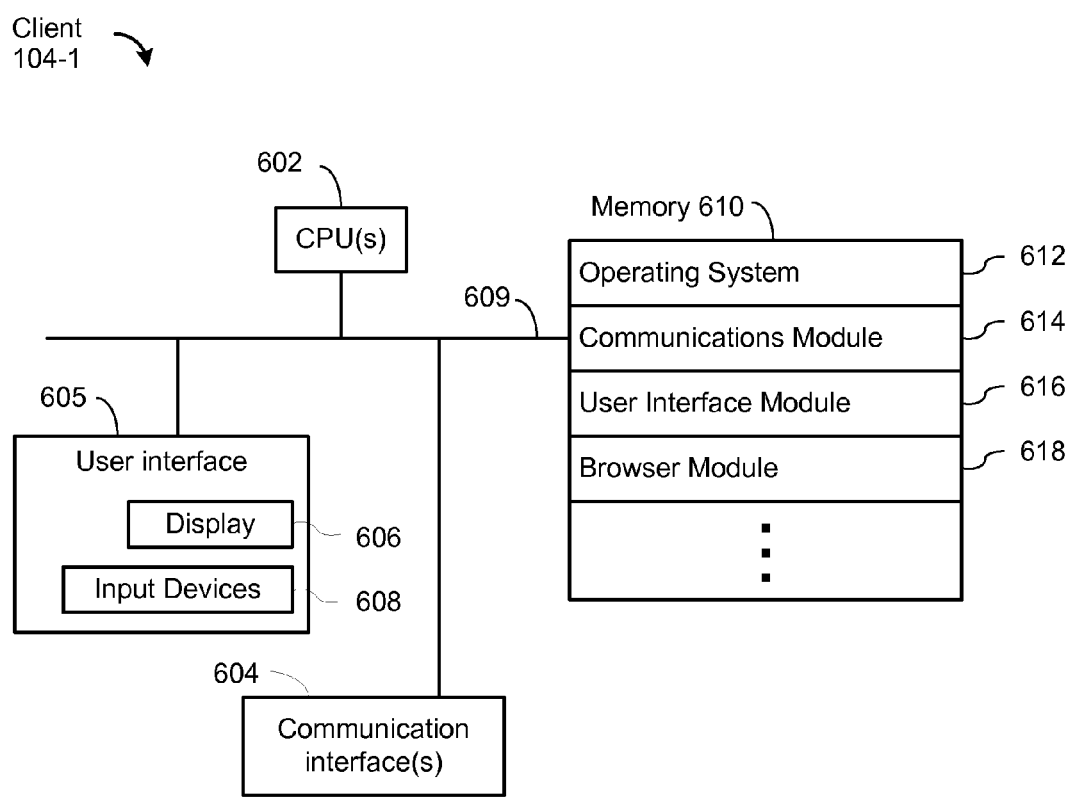
FIG. 6 is a block diagram illustrating a client, according to some embodiments.

FIG. 6 is a block diagram illustrating the client 104-1, according to some embodiments. Note that although FIG. 6 refers to the client 104-1, the other clients 104 include similar structures and modules as the client 104-1. The client 104-1 typically includes one or more processing units (CPU's, sometimes called processors) 602 for executing programs (e.g., programs stored in memory 610), one or more network or other communications interfaces 604, memory 610, and one or more communication buses 609 for interconnecting these components. The communication buses 609 may include circuitry (sometimes called a chipset) that interconnects and controls communications between system components. The client 104-1 includes a user interface 605 comprising a display device 606 and input devices 608 (e.g., keyboard, mouse, touch screen, keypads, etc.). Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some embodiments, memory 610 or the computer readable storage medium of memory 610 stores the following programs, modules and data structures, or a subset thereof:

- an operating system 612 that includes procedures for handling various basic system services and for performing hardware dependent tasks;
- a communication module 614 that is used for connecting the client 104-1 to other computers via the one or more communication interfaces 604 (wired or wireless) and one or more communication networks, such as the Internet, other wide area networks, local area networks, metropolitan area networks, and so on;
- a user interface module 616 that receives commands from the user via the input devices 608 and generates user interface objects in the display device 606; and
- a browser module 618 that provides a user interface for users to access and obtain documents and/or services hosted on servers (e.g., the server 102), renders the documents and/or services in the user interface, and/or executes scripts (or other code).

In some embodiments, the programs or modules identified above correspond to sets of instructions for performing a function described above. The sets of instructions can be executed by one or more processors (e.g., the CPUs 602). The above identified modules or programs (i.e., sets of instructions) need not be implemented as separate software programs, procedures or modules, and thus various subsets of these programs or modules may be combined or otherwise re-arranged in various embodiments. In some embodiments, memory 610 stores a subset of the modules and data structures identified above. Furthermore, memory 610 may store additional modules and data structures not described above.

Although FIG. 6 shows a "client" FIG. 6 is intended more as functional description of the various features which may be present in a client than as a structural schematic of the embodiments described herein. In practice, and as recognized by those of ordinary skill in the art, items shown separately could be combined and some items could be separated.

Identifying Chains of Related Search Queries

Figure 7:
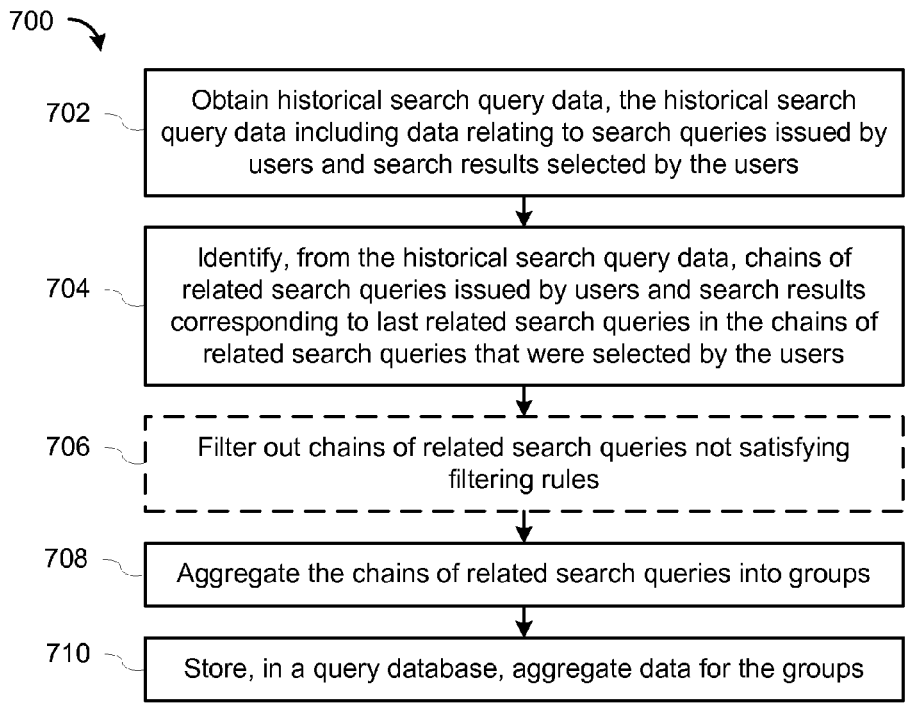
FIG. 7 is a flowchart of a method for identifying chains of related search queries, according to some embodiments.

FIG. 7 is a flowchart of a method 700 for identifying chains of related search queries, according to some embodiments. The related search queries module 214 obtains (702) the historical search query data 212. As discussed above, the historical search query data 212 includes data relating to search queries issued by users and search results selected by the users.

The related search queries module 214 identifies (704), from the historical search query data 212, chains of related search queries issued by users and search results corresponding to last related search queries in the chains of related search queries that were selected by the users. As discussed above with reference to FIG. 3, each respective related search query in a respective chain of related search queries except for a respective last related search query in the respective chain of related search queries violates a search result selection criterion. Furthermore, in some embodiments, a respective related search query in a respective chain of related search queries satisfies the search result selection criterion when a time interval between a time when users selected a respective search result corresponding to the respective related search query in the respective chain of related search queries and a time when users issued a subsequent search query in the respective chain of related search queries exceeds a predetermined time interval.

In some embodiments, the related search queries module 214 optionally filters (706) out chains of related search queries not satisfying filtering rules (e.g., the filtering rules 518). In some embodiments, the filtering rules include a rule requiring that a title associated with a search result corresponding to a last related search query in a chain of related search queries that was selected by the users and a first related search query in the chain of related search queries include at least a first predetermined number of common terms. In some embodiments, the filtering rules include a rule requiring that a last related search query and a first related search query in a chain of related search queries include at least a second predetermined number of common terms. In some embodiments, the filtering rules include a rule requiring that a last related search query and a first related search query in a chain of related search queries are included in the chain of related search queries for at least a predetermined number of search sessions in the historical search query data. In some embodiments, the filtering rules include a rule requiring that a last related search query and a first related search query in a chain of related search queries do not include location-specific search terms. In some embodiments, the filtering rules include a rule requiring that a ratio of a number of times that a search result in a last related search query in a chain of related search queries was selected and a number of times that a first related search query in the chain of related search queries was issued exceeds a predetermined threshold. In some embodiments, the filtering rules include a rule requiring that a likelihood that a last related search query in a chain of related search queries is related to objectionable content is below a predetermined likelihood threshold. In some embodiments, the filtering rules include a rule requiring that each related search query in a chain of related search query is issued by at least one same user. In some embodiments, the filtering rules include a rule requiring that a search result corresponding to a last related search query in a chain of related search queries that was selected by the users is not included in search results corresponding to a first related search query in the chain of related search queries. Note that the related search queries module 214 may use any combination of the aforementioned filtering rules to filter out chains of related search queries not satisfying the filtering rules.

The related search queries module 214 aggregates (708) the chains of related search queries into groups, where a respective group has a common first search query and a common search result corresponding to at least one last related search query that was selected by the users. As discussed above, users that issued the same first search query may have arrived at the desired search result through different chains of related search queries.

The related search queries module 214 stores (710), in the query database 216, aggregate data for the groups. In some embodiments, the historical search query module 212 stores the aggregate data for the groups in the query database 216 using the data structure illustrated in FIG. 4. In these embodiments, for each group of chains of related search queries, the related search queries module 214 stores the following aggregate data for the group of chains of related search queries in a record 402 of the query database 216: a first related search query in the chains of related search queries for the group (e.g., $Q_1$ in FIG. 4), a number of times the first related search query was issued (e.g., # $Q_1$ in FIG. 4), a search result that was selected by users who issued the first related search query and that corresponds to at least one last related search query in the chains of related search queries for the group (e.g., D in FIG. 4), the at least one last related search query (e.g., $\{Q_N\}$ in FIG. 4), and a number of times the first related search query led to a selection of the search result (e.g., # $Q_1 \rightarrow D$ in FIG. 4).

After populating the query database 216, search result insertion module 218 and the related searches module 220 may use the aggregate data for the chains of related search queries stored in the query database 216 to identify search results satisfying a search query and to identify related search queries, respectively.

Identifying Search Results

Figure 8:
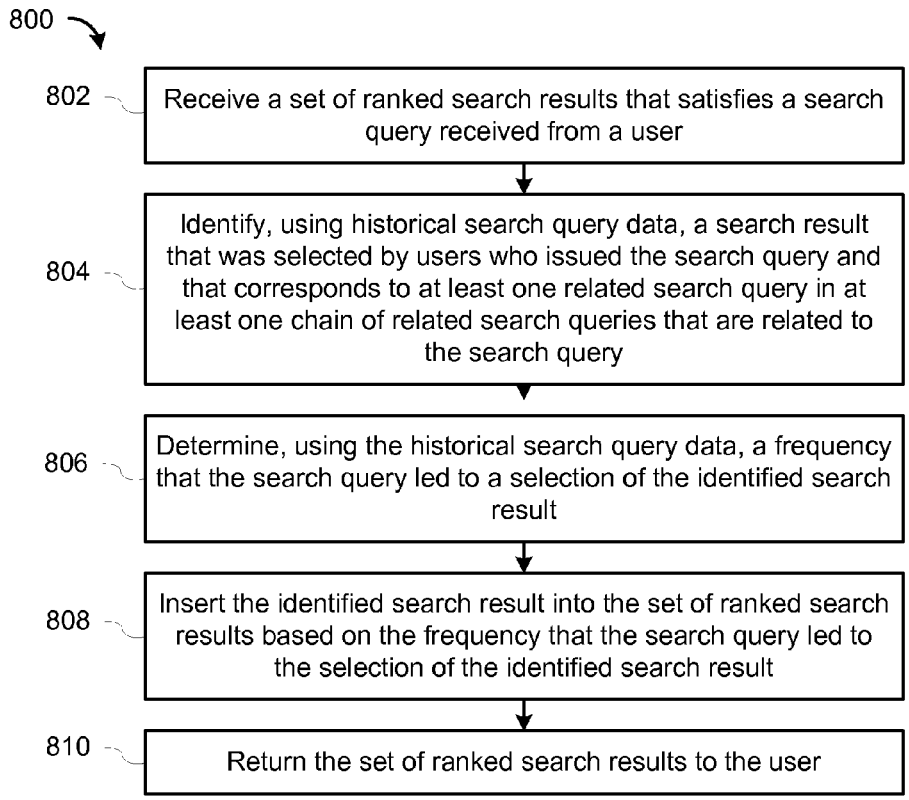
FIG. 8 is a flowchart of a method for identifying search results satisfying a search query, according to some embodiments.

FIG. 8 is a flowchart of a method 800 for identifying search results satisfying a search query, according to some embodiments. The search result insertion module 218 receives (802) a set of ranked search results that satisfies a search query (e.g., the search query 230) received from a user (e.g., the user 106-1).

The search result insertion module 218 identifies (804), using the historical search query data 212, a search result that was selected by users who issued the search query and that corresponds to at least one related search query in at least one chain of related search queries that are related to the search query. As discussed above with reference to FIG. 3, each respective related search query in the at least one chain of related search queries except for a last related search query in the at least one chain of related search queries violates the search result selection criterion. In some embodiments, a respective related search query in the at least one chain of related search queries satisfies the search result selection criterion when a time interval between a time when users selected a respective search result corresponding to the respective related search query in the at least one chain of related search queries and a time when users issued a subsequent search query exceeds a predetermined time interval.

In some embodiments, the search result insertion module 218 identifies (804) the search result that was selected by the users who issued the search query and that corresponds to the at least one related search query in the at least one chain of related search queries by querying the query database 216 to identify the search result that was selected by the users who issued the search query.

In some embodiments, the identified search result is included in at least one last set of search results corresponding to at least one last related search query in the at least one chain of related search queries, and a first search query in the at least one chain of related search queries is the search query (e.g., the search query 230).

In some embodiments, the identified search result is not included in the set of ranked search results.

In some embodiments, the identified search result is the most frequently selected search result corresponding to the at least one related search query in the at least one chain of related search queries.

The search result insertion module 218 determines (806), using the historical search query data 212, a frequency that the search query led to a selection of the identified search result. In some embodiments, the search result insertion module 218 determines (806) the frequency that the search query led to the selection of the search result by querying the query database 216 to determine the frequency that the search query led to the selection of the search result.

The search result insertion module 218 insert (808) the identified search result into the set of ranked search results (e.g., the ranked search results 236) based on the frequency that the search query led to the selection of the identified search result. Operation 808 is described in more detail with reference to FIG. 9.

The search result insertion module 218 returns (810) the set of ranked search results (e.g., the ranked search results 238) to the user.

Figure 9:
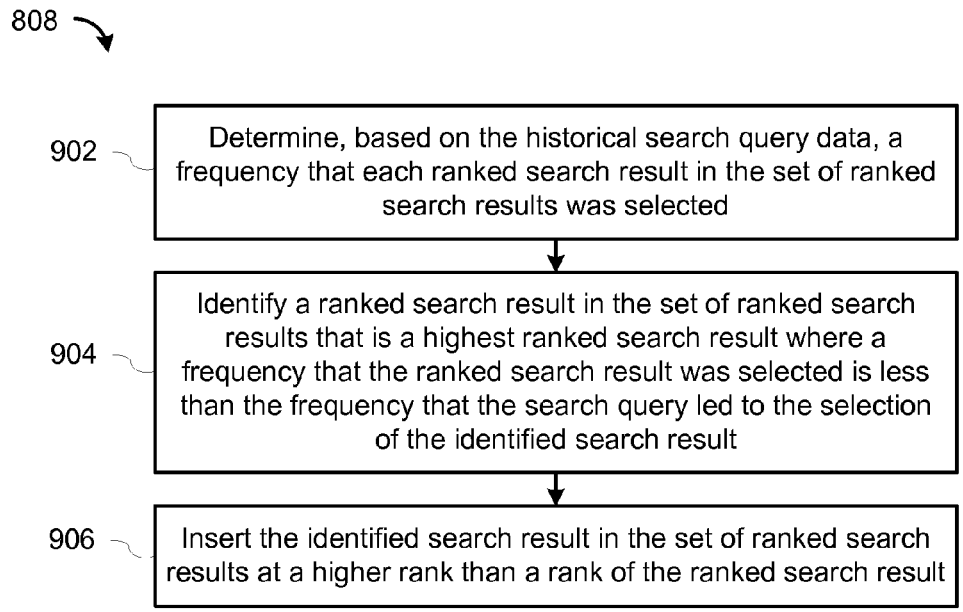
FIG. 9 is a flowchart of a method for inserting a search result into a set of ranked search results based on a frequency that the search query led to a selection of the search result, according to some embodiments.

FIG. 9 is a flowchart of a method for inserting (808) a search result into a set of ranked search results based on a frequency that the search query led to a selection of the search result, according to some embodiments. The search result insertion module 218 determines (902), based on the historical search query data 212, a frequency that each ranked search result in the set of ranked search results was selected.

The search result insertion module 218 identifies (904) a ranked search result in the set of ranked search results that is a highest ranked search result where a frequency that the ranked search result was selected is less than the frequency that the search query led to the selection of the identified search result.

The search result insertion module 218 inserts (906) the identified search result in the set of ranked search results at a higher rank than a rank of the ranked search result.

Figure 10:
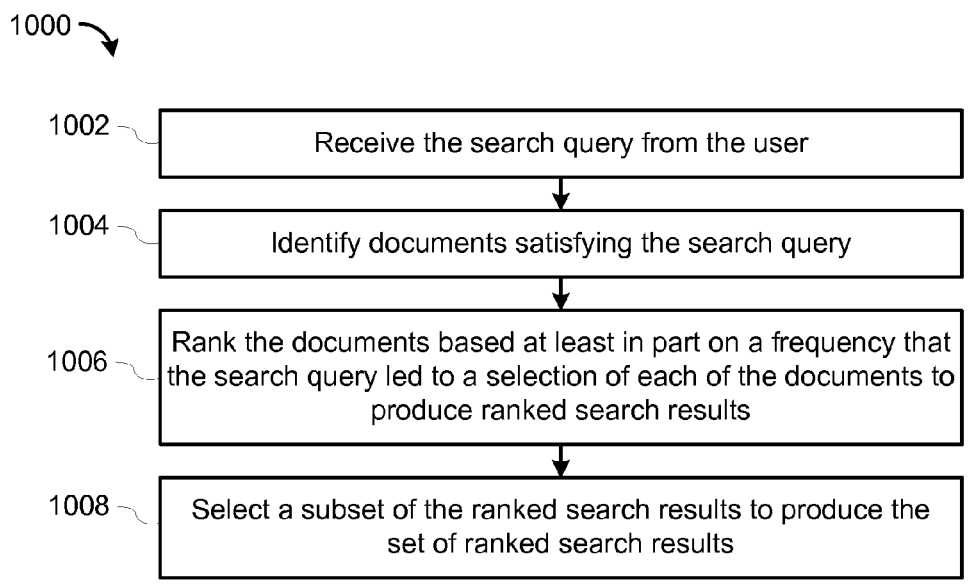
FIG. 10 is a flowchart of a method for identifying a set of ranked search results, according to some embodiments.

Prior to the search result insertion module 218 receiving (802) the set of ranked search results that satisfies the search query received from a user, the search query is received and processed by the server 102. FIG. 10 is a flowchart of a method for identifying a set of ranked search results, according to some embodiments. The front end module receives (1002) the search query from the user. The search engine 206 identifies (1004) documents satisfying the search query, ranks (1006) the documents based at least in part on a frequency that the search query led to a selection of each of the documents to produce ranked search results, and selects (1008) a subset of the ranked search results to produce the set of ranked search results (e.g., the ranked search results 236).

Identifying Related Search Queries

Figure 11:
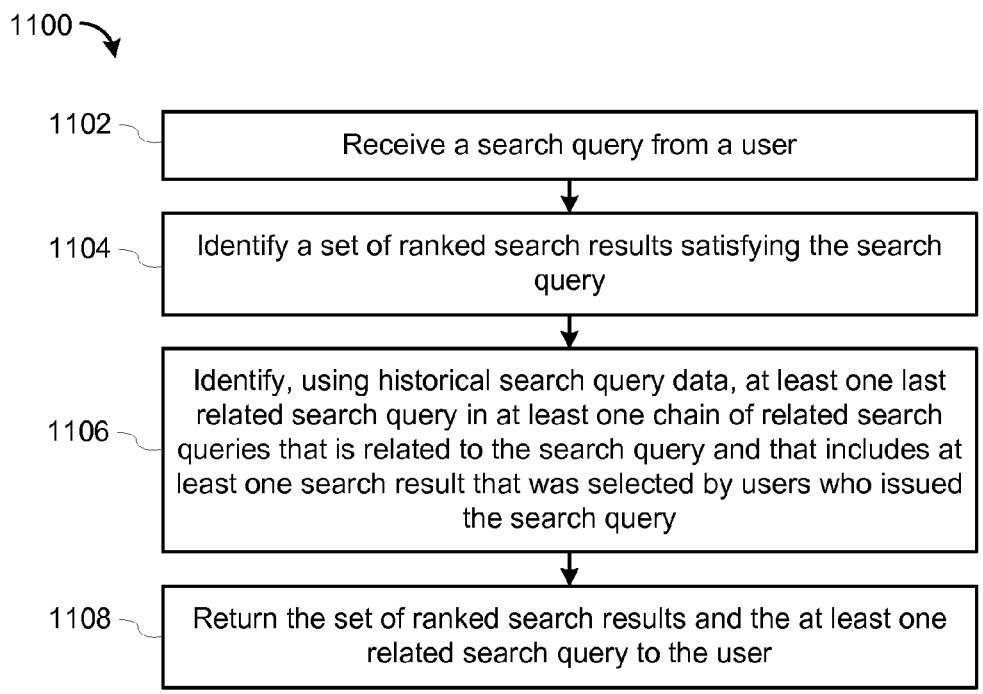
FIG. 11 is a flowchart of a method for identifying related search queries, according to some embodiments.

FIG. 11 is a flowchart of a method 1100 for identifying related search queries, according to some embodiments. The related searches module 220 receives (1102) a search query (e.g., the search query 230) from a user (e.g., the user 106-1).

The search engine 206 identifies (1104) a set of ranked search results (e.g., the ranked search results 236, the ranked search results 238) satisfying the search query. As discussed above with reference to FIG. 10, the search engine 206 identifies the set of ranked search results satisfying the search query by identifying (1004) documents satisfying the search query, ranking (1006) the documents based at least in part on a frequency that the search query led to a selection of each of the documents to produce ranked search results, and selecting (1008) a subset of the ranked search results to produce the set of ranked search results.

The related searches module 220 identifies (1106), using the historical search query data 212, at least one last related search query (e.g., the related search queries 240) in at least one chain of related search queries that is related to the search query and that includes at least one search result that was selected by users who issued the search query. As discussed above, each respective related search query in the at least one chain of related search queries except for the at least one last related search query in the at least one chain of related search queries violates the search result selection criterion. In some embodiments, a respective related search query in the at least one chain of related search queries satisfies the search result selection criterion when a time interval between a time when users selected a respective search result corresponding to the respective related search query in the at least one chain of related search queries and a time when users issued a subsequent search query exceeds a predetermined time interval.

In some embodiments, a first search query in the at least one chain of related search queries is the search query (e.g., the search query 230).

In some embodiments, the related searches module 220 identifies (1106) the at least one last related search query in the at least one chain of related search queries that are related to the search query by querying the query database 216 to identify the at least one last related search query in the at least one chain of related search queries that are related to the search query.

Figure 12:
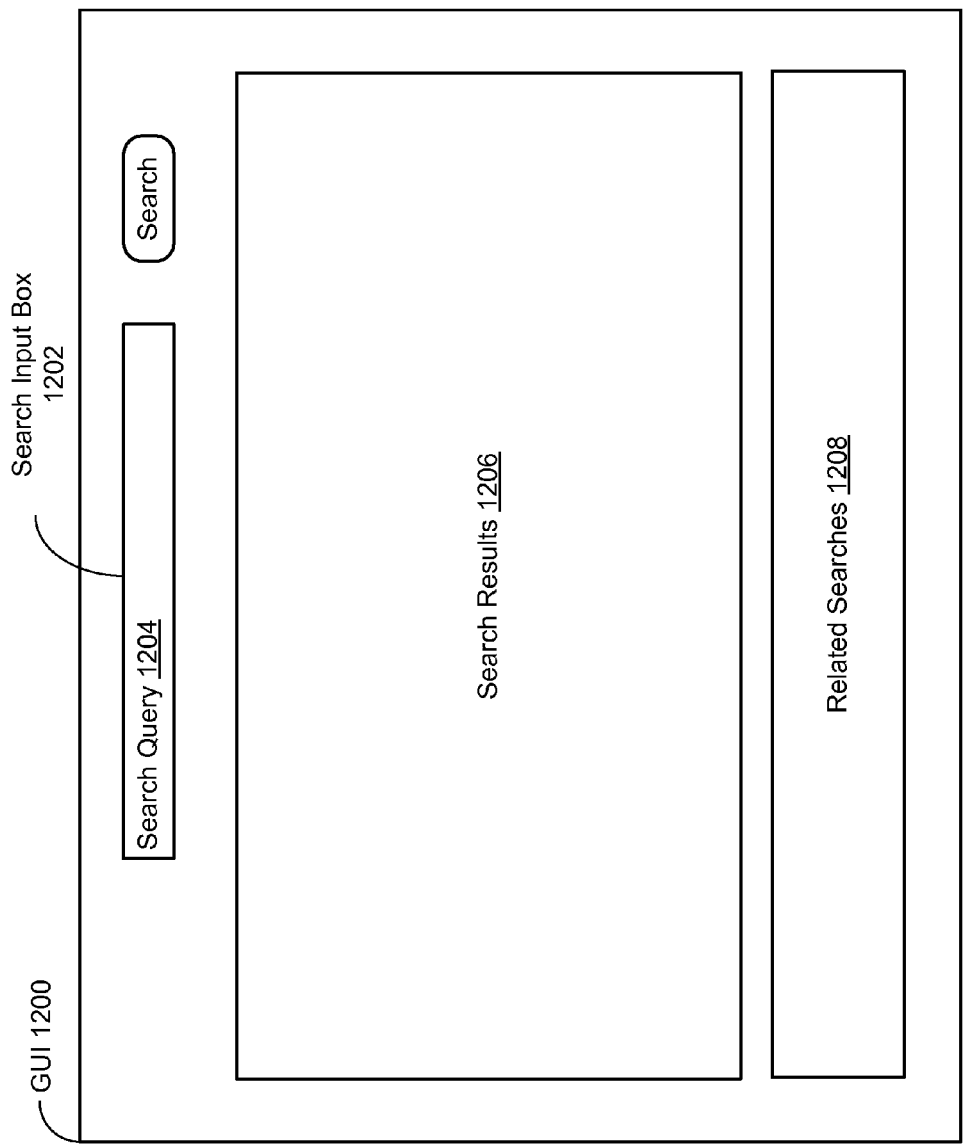
FIG. 12 is a block diagram illustrating an example search results page, according to some embodiments.

The related searches module 220 returns (1108) the set of ranked search results and the at least one related search query to the user. In some embodiments, the client displays the set of ranked search results and the at least one related search query to the user. FIG. 12 is a block diagram illustrating an example search results page displayed in a graphical user interface (GUI) 1200, according to some embodiments. The search results page optionally includes search input box 1202 that optionally includes a search query 1204 that corresponds to the search query issued by a user. As illustrated in FIG. 12, the search results 1206 corresponding to the search query 1204 are displayed with related search queries 1208 (e.g., as determined using the process discussed above with reference to FIG. 11).

The methods illustrated in FIGS. 7-11 may be governed by instructions that are stored in a computer readable storage medium and that are executed by at least one processor of at least one server. Each of the operations shown in FIGS. 7-11 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computer-implemented method for identifying search results satisfying a search query, performed on a server having at least one processor and memory storing at least one program for execution by the at least one processor to perform the method, comprising:
   receiving a set of ranked search results that satisfies a search query received from a user;
   identifying, using historical search query data, a search result that was selected by users who issued the search query and that corresponds to at least one related search query in at least one chain of related search queries that are related to the search query, each respective related search query in the at least one chain of related search queries, except for a last related search query in the at least one chain of related search queries, violating a timing criterion with respect to user-selection of search results,
   wherein a respective chain of related search queries is a sequence of consecutive search queries that are issued by a respective user and that include an initial search query that is successively refined;
   determining, using the historical search query data, a frequency that the search query led to a selection of the identified search result;
   inserting the identified search result into the set of ranked search results based on the frequency that the search query led to the selection of the identified search result, wherein inserting the identified search result into the set of ranked search results based on the frequency that the search query led to the selection of the identified search result includes:
      determining, based on the historical search query data, a frequency that each ranked search result in the set of ranked search results was selected,
      identifying a ranked search result in the set of ranked search results that is a highest ranked search result where a frequency that the ranked search result was selected is less than the frequency that the search query led to the selection of the identified search result, and
      inserting the identified search result in the set of ranked search results at a higher rank than a rank of the ranked search result; and
   returning the set of ranked search results to the user.

2. The computer-implemented method of claim 1, wherein a respective related search query in the at least one chain of related search queries satisfies the timing criterion when a time interval between a time when a respective user selected a respective search result corresponding to the respective related search query in the at least one chain of related search queries and a time when the respective user issued a subsequent search query exceeds a predetermined time interval.

3. The computer-implemented method of claim 1, wherein prior to receiving the set of ranked search results that satisfies the search query received from the user, the method includes:
   receiving the search query from the user;
   identifying documents satisfying the search query;

ranking the documents based at least in part on a frequency that the search query led to a selection of each of the documents to produce ranked search results; and selecting a subset of the ranked search results to produce the set of ranked search results.

4. The computer-implemented method of claim 1, wherein the identified search result is included in at least one last set of search results corresponding to at least one last related search query in the at least one chain of related search queries, and wherein a first search query in the at least one chain of related search queries is the search query.

5. The computer-implemented method of claim 1, wherein identifying the search result that was selected by the users who issued the search query and that corresponds to the at least one related search query in the at least one chain of related search queries includes querying a query database to identify the search result that was selected by the users who issued the search query.

6. The computer-implemented method of claim 1, wherein determining the frequency that the search query led to the selection of the search result includes querying a query database to determine the frequency that the search query led to the selection of the search result.

7. The computer-implemented method of claim 6, wherein the query database includes a plurality of records, wherein each respective record includes:
a respective search query;
a number of times the respective search query was issued;
a respective search result that was selected by users who issued the respective search query and that corresponds to at least one respective related search query in at least one respective chain of related search queries that are related to the respective search query;
the at least one respective related search query; and
a number of times the respective search query led to a selection of the respective search result.

8. The computer-implemented method of claim 1, wherein the identified search result is not included in the set of ranked search results.

9. The computer-implemented method of claim 1, wherein the identified search result is the most frequently selected search result corresponding to the at least one related search query in the at least one chain of related search queries.

10. The computer-implemented method of claim 1, wherein the historical search query data includes frequencies that respective search queries led to selections of respective search results.

11. The computer-implemented method of claim 1, wherein a title associated with the identified search result and the search query include at least a first predetermined number of common terms.

12. The computer-implemented method of claim 1, wherein the at least one related search query and the search query includes at least a second predetermined number of common terms.

13. The computer-implemented method of claim 1, wherein the at least one related search query and the search query are included in the at least one chain of related search queries for at least a predetermined number of search sessions in the historical search query data.

14. The computer-implemented method of claim 1, wherein the at least one related search query and the search query do not include location-specific search terms.

15. The computer-implemented method of claim 1, wherein a ratio of a number of times that the identified search result was selected and a number of times that the search query was issued exceeds a predetermined threshold.

16. The computer-implemented method of claim 1, wherein a likelihood that the at least one related search query is related to objectionable content is below a predetermined likelihood threshold.

17. The computer-implemented method of claim 1, wherein each related search query in the at least one chain of related search queries is issued by at least one same user.

18. A system to identify search results satisfying a search query, comprising:
at least one processor;
memory; and
at least one program stored in the memory and executable by the at least one processor, the at least one program comprising instructions to:
receive a set of ranked search results that satisfies a search query received from a user;
identify, using historical search query data, a search result that was selected by users who issued the search query and that corresponds to at least one related search query in at least one chain of related search queries that are related to the search query, each respective related search query in the at least one chain of related search queries, except for a last related search query in the at least one chain of related search queries, violating a timing criterion with respect to user-selection of search results,
wherein a respective chain of related search queries is a sequence of consecutive search queries that are issued by a respective user and that include an initial search query that is successively refined;
determine, using the historical search query data, a frequency that the search query led to a selection of the identified search result;
insert the identified search result into the set of ranked search results based on the frequency that the search query led to the selection of the identified search result, further including instructions to:
determine, based on the historical search query data, a frequency that each ranked search result in the set of ranked search results was selected,
identify a ranked search result in the set of ranked search results that is a highest ranked search result where a frequency that the ranked search result was selected is less than the frequency that the search query led to the selection of the identified search result, and
insert the identified search result in the set of ranked search results at a higher rank than a rank of the ranked search result; and
return the set of ranked search results to the user.

19. The system of claim 18, wherein a respective related search query in the at least one chain of related search queries satisfies the timing criterion when a time interval between a time when a respective user selected a respective search result corresponding to the respective related search query in the at least one chain of related search queries and a time when a respective user issued a subsequent search query exceeds a predetermined time interval.

20. The system of claim 18, wherein prior to receiving the set of ranked search results that satisfies the search query received from the user, the at least one program includes instructions to:
receive the search query from the user;
identify documents satisfying the search query;
rank the documents based at least in part on a frequency that the search query led to a selection of each of the documents to produce ranked search results; and select a subset of the ranked search results to produce the set of ranked search results.

21. The system of claim 18, wherein the identified search result is included in at least one last set of search results corresponding to at least one last related search query in the at least one chain of related search queries, and wherein a first search query in the at least one chain of related search queries is the search query.

22. The system of claim 18, wherein the instructions to identify the search result that was selected by the users who issued the search query and that corresponds to the at least one related search query in the at least one chain of related search queries include instructions to query a query database to identify the search result that was selected by the users who issued the search query.

23. The system of claim 18, wherein the instructions to determine the frequency that the search query led to the selection of the search result include instructions to query a query database to determine the frequency that the search query led to the selection of the search result.

24. The system of claim 23, wherein the query database includes a plurality of records, wherein each respective record includes:
   a respective search query;
   a number of times the respective search query was issued;
   a respective search result that was selected by users who issued the respective search query and that corresponds to at least one respective related search query in at least one respective chain of related search queries that are related to the respective search query;
   the at least one respective related search query; and
   a number of times the respective search query led to a selection of the respective search result.

25. The system of claim 18, wherein the identified search result is not included in the set of ranked search results.

26. The system of claim 18, wherein the identified search result is the most frequently selected search result corresponding to the at least one related search query in the at least one chain of related search queries.

27. The system of claim 18, wherein the historical search query data includes frequencies that respective search queries led to selections of respective search results.

28. The system of claim 18, wherein a title associated with the identified search result and the search query include at least a first predetermined number of common terms.

29. The system of claim 18, wherein the at least one related search query and the search query includes at least a second predetermined number of common terms.

30. The system of claim 18, wherein the at least one related search query and the search query are included in the at least one chain of related search queries for at least a predetermined number of search sessions in the historical search query data.

31. The system of claim 18, wherein the at least one related search query and the search query do not include location-specific search terms.

32. A non-transitory computer readable storage medium storing at least one program configured for execution by at least one processor of a computer system, the at least one program comprising instructions to:
   receive a set of ranked search results that satisfies a search query received from a user;
   identify, using historical search query data, a search result that was selected by users who issued the search query and that corresponds to at least one related search query in at least one chain of related search queries that are related to the search query, each respective related search query in the at least one chain of related search queries, except for a last related search query in the at least one chain of related search queries, violating a timing criterion with respect to user-selection of search results,
      wherein a respective chain of related search queries is a sequence of consecutive search queries that are issued by a respective user and that include an initial search query that is successively refined;
   determine, using the historical search query data, a frequency that the search query led to a selection of the identified search result;
   insert the identified search result into the set of ranked search results based on the frequency that the search query led to the selection of the identified search result, further including instructions to:
      determine, based on the historical search query data, a frequency that each ranked search result in the set of ranked search results was selected,
      identify a ranked search result in the set of ranked search results that is a highest ranked search result where a frequency that the ranked search result was selected is less than the frequency that the search query led to the selection of the identified search result, and
      insert the identified search result in the set of ranked search results at a higher rank than a rank of the ranked search result; and
   return the set of ranked search results to the user.

33. The non-transitory computer readable storage medium of claim 32, wherein a respective related search query in the at least one chain of related search queries satisfies the search result selection timing criterion when a time interval between a time when a respective user selected a respective search result corresponding to the respective related search query in the at least one chain of related search queries and a time when the respective user issued a subsequent search query exceeds a predetermined time interval.

* * * * *